(12) United States Patent
Mohedas et al.

(10) Patent No.: US 9,074,148 B2
(45) Date of Patent: Jul. 7, 2015

(54) HYDROGEN AND CARBON UTILIZATION IN SYNTHETIC FUELS PRODUCTION PLANTS

(75) Inventors: Sergio Mohedas, Westminster, CO (US); Mark Ibsen, Highlands Ranch, CO (US)

(73) Assignee: RES USA, LLC, Westminster, CO (US)

( * ) Notice: Subject to any disclaimer, the term of this patent is extended or adjusted under 35 U.S.C. 154(b) by 951 days.

(21) Appl. No.: 13/248,547

(22) Filed: Sep. 29, 2011

(65) Prior Publication Data

US 2012/0022173 A1 Jan. 26, 2012

Related U.S. Application Data

(62) Division of application No. 12/207,978, filed on Sep. 10, 2008, now Pat. No. 8,088,187.

(60) Provisional application No. 60/971,059, filed on Sep. 10, 2007.

(51) Int. Cl.
*C01B 3/34* (2006.01)
*C01B 3/56* (2006.01)
(Continued)

(52) U.S. Cl.
CPC .. *C10J 3/00* (2013.01); *B01J 37/16* (2013.01); *B01J 37/18* (2013.01); *C01B 3/34* (2013.01); (Continued)

(58) Field of Classification Search
CPC .............. B01J 37/16; C01B 3/34; C01B 3/56; C01B 2203/0405; C01B 2203/043; C01B 2203/046; C01B 2203/0916
USPC ............................................................ 48/61
See application file for complete search history.

(56) References Cited

U.S. PATENT DOCUMENTS

| 4,650,814 A | 3/1987 | Keller |
| 5,324,335 A | 6/1994 | Benham et al. |

(Continued)

FOREIGN PATENT DOCUMENTS

| CN | 1295544 A | 5/2001 |
| EP | 1054851 | 11/2000 |

(Continued)

OTHER PUBLICATIONS

Canadian Office Action dated Feb. 1, 2013 for corresponding Canadian Application No. 2,699,790 (4 pgs.).

(Continued)

*Primary Examiner* — Matthew Merkling
(74) *Attorney, Agent, or Firm* — Timothy S. Westby; Porter Hedges LLP

(57) ABSTRACT

A system including at least one hydrogen extraction unit comprising an inlet for a synthesis feedgas from a synthesis feedgas line and adapted to remove at least one hydrogen-rich gas and at least one hydrogen-lean gas from the synthesis feedgas to yield a refined synthesis gas; and at least one hydrocarbon synthesis reactor, at least one dedicated activation reactor, or both, wherein the at least one hydrocarbon synthesis reactor is fluidly connected with the at least one hydrogen extraction unit and configured to provide liquid hydrocarbons and a first byproduct gas from a synthesis reactor feedstream comprising at least a portion of the refined synthesis gas; and wherein the at least one dedicated activation reactor is fluidly connected with the at least one hydrogen extraction unit, the at least one hydrocarbon synthesis reactor, or both, and configured for activation of hydrocarbon synthesis catalyst via an activation gas.

21 Claims, 4 Drawing Sheets

(51) Int. Cl.
*B01J 37/16* (2006.01)
*C10G 49/02* (2006.01)
*C10J 3/00* (2006.01)
*B01J 37/18* (2006.01)
*C10G 2/00* (2006.01)
*C10G 45/60* (2006.01)
*C10G 47/02* (2006.01)
*C10K 3/00* (2006.01)

(52) U.S. Cl.
CPC ............ C01B 3/56 (2013.01); *C01B 2203/0405* (2013.01); *C01B 2203/043* (2013.01); *C01B 2203/046* (2013.01); *C01B 2203/0485* (2013.01); *C01B 2203/049* (2013.01); *C01B 2203/062* (2013.01); C10G 2/332 (2013.01); C10G 45/60 (2013.01); C10G 47/02 (2013.01); C10G 49/02 (2013.01); *C10J 2300/0916* (2013.01); *C10J 2300/093* (2013.01); *C10J 2300/0943* (2013.01); *C10J 2300/1618* (2013.01); *C10J 2300/1659* (2013.01); *C10J 2300/1823* (2013.01); C10K 3/00 (2013.01); *C10G 2300/1011* (2013.01); *C10G 2300/703* (2013.01)

(56) References Cited

U.S. PATENT DOCUMENTS

| | | | |
|---|---|---|---|
| 6,043,288 | A | 3/2000 | DeGeorge et al. |
| 6,475,943 | B1 * | 11/2002 | Hoek et al. ............... 502/53 |
| 6,586,481 | B2 | 7/2003 | Pederzani et al. |
| 6,890,962 | B1 | 5/2005 | O'Rear et al. |
| 6,946,493 | B2 | 9/2005 | Mohedas et al. |
| 6,958,363 | B2 | 10/2005 | Espinoza et al. |
| 6,962,947 | B2 | 11/2005 | Wright et al. |
| 7,001,928 | B2 | 2/2006 | Raje |
| 7,004,985 | B2 | 2/2006 | Wallace et al. |
| 7,247,656 | B2 | 7/2007 | Guo et al. |
| 2002/0183405 | A1 | 12/2002 | Pederzani et al. |
| 2004/0059009 | A1 * | 3/2004 | Belt et al. ............... 518/726 |
| 2004/0180974 | A1 | 9/2004 | Espinoza et al. |
| 2004/0181313 | A1 | 9/2004 | Mohedas et al. |
| 2004/0220437 | A1 | 11/2004 | Jothimurugesan et al. |
| 2005/0124706 | A1 | 6/2005 | Wright et al. |
| 2007/0010588 | A1 | 1/2007 | Pearson |

FOREIGN PATENT DOCUMENTS

| | | |
|---|---|---|
| EP | 1400580 | 4/2004 |
| WO | 2004-083343 | 9/2004 |

OTHER PUBLICATIONS

Notice of Allowance dated Aug. 23, 2011 for or corresponding U.S. Appl. No. 12/207,978 (9 pgs.).
European Office Action Office Action dated Jan. 3, 2013 for corresponding European Application No. 08799407.5 (5 pgs.).
International Search Report, International Application No. PCT/US2008/075863, dated Mar. 11, 2009 (10 pp.).
India Examination Report dated Feb. 24, 2014 for corresponding India Application No. 2296/DELNP/2010 (2 pgs.).
European Search Report dated, European Application No. 08799407.5, dated Sep. 21, 2011, (7 pages).
Office Action dated Jun. 21 2012, Canadian Patent Application No. 2,699,790, (3 page).
Office Action dated Aug. 3, 2012, Chinese Application No. 200880106325.0, English translation, (20 pages).
Office Action dated Sep. 20, 2012, Australian Application No. 2008299002, (3 pages).

* cited by examiner

HYDROGEN AND CARBON UTILIZATION IN SYNTHETIC FUELS PRODUCTION PLANTS

CROSS-REFERENCE TO RELATED APPLICATIONS

This application is a divisional application which claims the benefit under 35 U.S.C. §121 of U.S. patent application Ser. No. 12/207,978, filed Sep. 10, 2008, which claims the benefit under 35 U.S.C. §119(e) of U.S. Provisional Patent Application No. 60/971,059, filed Sep. 10, 2007, the disclosures of each of which are hereby incorporated herein by reference in their entirety for all purposes.

STATEMENT REGARDING FEDERALLY SPONSORED RESEARCH OR DEVELOPMENT

Not applicable.

BACKGROUND

1. Field of the Invention

This invention relates generally to the field of synthetic fuel (synfuel) production. Specifically, the invention relates to a method of maximizing hydrogen and carbon utilization in synfuel production using carbonaceous material as primary feedstocks.

2. Background of the Invention

There are many processes known in the art for converting hydrocarbon sources such as natural gas, coal, coke, biomass, etc., into more valuable hydrocarbon products. A typical conversion process involves first converting the hydrocarbon source into synthesis gas or syngas, which is a mixture of primarily carbon monoxide and hydrogen. If the hydrocarbon source is natural gas, NG, a catalytic reforming reaction is utilized to make synthesis gas (partial oxidation processes are also used with NG). If the hydrocarbon source is residual oil or a solid feed, partial oxidation or gasification may be used. However obtained, the synthesis gas produced may subsequently be utilized as a feedstock from which to produce a wide range of chemical products. Such chemical products include combustible liquid fuels, methanol, ammonia, acetic acid, dimethyl ether, oxo alcohols, isocyanates, and others.

Remote natural gas assets can be converted into conventional transportation fuels, chemical feedstocks, and lubricants via an initial production of synthesis gas. The Fischer-Tropsch process is the conventional route for the conversion of synthesis gas into transportation fuels and lubricants. Alternatively, synthesis gas produced from natural gas may be used to synthesize methanol. The methanol may subsequently be utilized to produce a wide variety of chemicals.

In particular, a Fischer-Tropsch synthesis reaction may be used to synthesize higher molecular weight hydrocarbon products from synthesis gas. In Fischer-Tropsch synthesis reactions, synthesis gas is converted to hydrocarbons by contact with a Fischer-Tropsch catalyst under reactive conditions. The products from a Fischer-Tropsch process may range from $C_1$ to $C_{200+}$ with a majority in the $C_5$-$C_{100+}$ range. The Fischer-Tropsch synthesis reaction can be conducted in a variety of reactor types which include but are not limited to, fixed bed reactors containing one or more catalyst beds, slurry reactors, fluidized bed reactors, or a combination of different reactor types.

In traditional Fischer-Tropsch processes, high purity hydrogen may be extracted for downstream conversion or upgrading of crude liquid Fischer-Tropsch hydrocarbons into desirable saleable products. The liquid hydrocarbon conversion process or product upgrading as it is more commonly known, may comprise a series of processes, such as separations, hydrogenation (saturation) of the olefinic and oxygenated components formed in the Fischer-Tropsch reactor and hydro-cracking, isomerization, and/or hydro-isomerization processes to convert long chain usually linear hydrocarbons into shorter and partially-branched chain hydrocarbons to yield mainly liquid hydrocarbons with molecules of carbon and hydrogen in the range defined as naphtha, diesel fuel and jet fuel. Some products may also be used as base oils or lubricants. The processes to extract high purity hydrogen from synthesis gas may generate off streams 'lean' in hydrogen compared to the hydrogen-rich stream desired for product upgrading. These 'lean' hydrogen streams are conventionally inefficiently utilized as fuel for the production plant.

Consequently, there is a need for improved utilization of hydrogen in synthesis gas production plants.

SUMMARY

Herein disclosed are a new system and process to effectively utilize hydrogen and carbon in synthetic fuels production plants that use carbonaceous materials as primary feedstocks. This invention provides a system and method of utilizing various hydrogen and carbon streams more efficiently than conventional systems and methods. A novel aspect of the disclosed process involves conveying a hydrogen-lean stream from a typical synthesis gas process to a catalyst activation or re-activation process. Further advantages and features of the process will be described in more detail below.

Herein disclosed is a system for the activation of hydrocarbon synthesis catalyst, the system comprising at least one hydrogen extraction unit comprising an inlet for a synthesis feedgas from a synthesis feedgas line and adapted to remove at least one hydrogen-rich gas and at least one hydrogen-lean gas from the synthesis feedgas to yield a refined synthesis gas; and an activation reactor operable to activate hydrocarbon synthesis catalyst, wherein the activation reactor comprises an inlet fluidly connected with the at least one hydrogen extraction unit whereby at least a portion of the hydrogen-lean gas, at least a portion of the hydrogen-rich gas, or at least a portion of both the hydrogen-rich gas and the hydrogen-lean gas may be introduced into the activation reactor. The system may further comprise at least one hydrocarbon synthesis reactor configured to produce liquid hydrocarbons and a first byproduct gas from a synthesis gas reactor feedstream comprising at least a portion of the refined synthesis gas, wherein the at least one hydrocarbon synthesis reactor is fluidly connected with the at least one hydrogen extraction unit whereby at least a portion of the refined synthesis gas may be introduced into the hydrocarbon synthesis reactor. In embodiments, the at least one hydrocarbon synthesis reactor is fluidly connected with the activation reactor whereby at least a portion of the first byproduct gas may be utilized for catalyst activation.

The system may further comprise at least one product upgrading unit fluidly connected with the at least one hydrocarbon synthesis reactor, wherein the at least one product upgrading unit is configured to upgrade at least a portion of the liquid hydrocarbons, thus producing upgraded liquid hydrocarbons and a second gas byproduct. In embodiments, the at least one product upgrading unit is selected from the group consisting of hydro-isomerization units, isomerization units, separators, hydro-crackers, and hydrogenation units. In embodiments, the at least one product upgrading unit is fluidly connected with the activation reactor whereby at least a portion of the second gas byproduct may be utilized for catalyst activation. The activation reactor may be fluidly connected with the synthesis feedgas line, the hydrogen extraction unit, or both, whereby at least a portion of the synthesis feedgas, at least a portion of the refined synthesis gas, or both may be introduced into the activation reactor.

In embodiments, the at least one hydrogen extraction reactor is selected from the group consisting of membrane separation units and pressure swing adsorption units. In embodiments, the activation reactor is a hydrocarbon synthesis reactor. The hydrocarbon synthesis reactor may be a Fischer-Tropsch reactor. In embodiments, the hydrocarbon synthesis catalyst is selected from the group consisting of iron-based Fischer-Tropsch catalysts, cobalt-based Fischer-Tropsch catalysts, and combinations thereof. In embodiments, the at least one hydrogen extraction unit is configured to provide a hydrogen-rich gas having a molar ratio of hydrogen to carbon monoxide in the range of greater than about 10. In embodiments, the at least one hydrogen extraction unit is configured to provide a hydrogen-lean gas having a molar ratio of hydrogen to carbon monoxide ratio of less than about 2. In embodiments, the at least one hydrogen extraction unit is fluidly connected with the activation reactor whereby at least a portion of the refined synthesis gas may be utilized for catalyst activation.

Also disclosed herein is a system for the activation of hydrocarbon synthesis catalyst, the system comprising at least one hydrogen extraction unit comprising an inlet for a synthesis feedgas from a synthesis feedgas line and adapted to remove at least one hydrogen-rich gas and at least one hydrogen-lean gas from the synthesis feedgas to yield a refined synthesis gas; and at least one hydrocarbon synthesis reactor, at least one dedicated activation reactor, or both, wherein, if present, the at least one hydrocarbon synthesis reactor is fluidly connected with the at least one hydrogen extraction unit and configured to provide liquid hydrocarbons and a first byproduct gas from a synthesis reactor feedstream comprising at least a portion of the refined synthesis gas; and wherein, if present, the at least one dedicated activation reactor is fluidly connected with the at least one hydrogen extraction unit, the at least one hydrocarbon synthesis reactor, or both, and configured for activation of hydrocarbon synthesis catalyst via an activation gas.

The system may further comprise at least one product upgrading unit configured to upgrade at least a portion of the liquid hydrocarbons, providing upgraded hydrocarbons and a second gas byproduct. In embodiments, the at least one product upgrading unit is fluidly connected with the at least one hydrogen extraction unit, whereby at least a portion of the at least one hydrogen-rich gas may be utilized for upgrading. In embodiments, the at least one product upgrading unit is fluidly connected with the at least one hydrocarbon synthesis reactor such that at least a portion of the second gas byproduct can be introduced into the at least one hydrocarbon synthesis reactor; the at least one product upgrading unit is fluidly connected with the at least one dedicated activation reactor such that at least a portion of the second gas byproduct can be introduced into the at least one dedicated activation reactor; the system further comprises a recycle line whereby at least a portion of the second gas byproduct provided by the at least one product upgrading unit can be reintroduced into the at least one product upgrading unit; or a combination thereof.

In embodiments, the at least one hydrogen extraction unit is fluidly connected with the at least one hydrocarbon synthesis reactor such that at least a portion of the hydrogen-rich gas can be utilized as a component of the synthesis reactor feedstream; the at least one hydrocarbon synthesis reactor is fluidly connected with the at least one dedicated activation reactor such that at least a portion of the first gas byproduct can be introduced into the at least one dedicated activation reactor; the system further comprises a recycle line whereby at least a portion of the first gas byproduct can be recycled to the at least one hydrocarbon synthesis reactor; or a combination thereof.

In embodiments, the at least one hydrogen extraction unit is fluidly connected with the at least one dedicated activation vessel whereby at least a portion of the hydrogen-lean gas, at least a portion of the hydrogen-rich gas, or both may be introduced into the at least one dedicated activation reactor.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

DESCRIPTION OF THE DRAWINGS

For a detailed description of the preferred embodiments of the invention, reference will now be made to the accompanying drawings in which.

The use of dashed lines in the Figures represents optional steps of the system/process.

NOTATION AND NOMENCLATURE

Certain terms are used throughout the following description and claims to refer to particular system components. This document does not intend to distinguish between components that differ in name but not function. In the following discussion and in the claims, the terms 'including' and 'comprising' are used in an open-ended fashion, and thus should be interpreted to mean 'including, but not limited to . . . '.

As used herein, syngas (i.e. synthesis gas) refers to a gas mixture that contains varying amounts of carbon monoxide and hydrogen.

As used herein, synfuel (i.e. synthetic fuel) refers to liquid fuels derived from gasification of one or more carbonaceous materials including without limitation, coal, biomass, and natural gas.

As used herein, the terms 'activation' and 'activation process(es)' refer to initial activation of fresh catalyst and initial activation process(es) for fresh catalyst as well as re-activation of used catalyst and catalyst reactivation process(es).

DETAILED DESCRIPTION

Overview

Herein disclosed are systems and processes for production and potentially economically-desirable utilization of hydrogen-lean gas products in synthetic fuels production plants. The economics of the production of synthetic fuels may be significantly impacted by utilization of the hydrogen and carbon contained in the primary carbonaceous material feedstocks. The disclosed system and process may be used in any suitable commercial process including, without limitation, gas to liquid (GTL), coal to liquid (CTL), and biomass to liquid (BTL) processes.

System

Figure 1A:
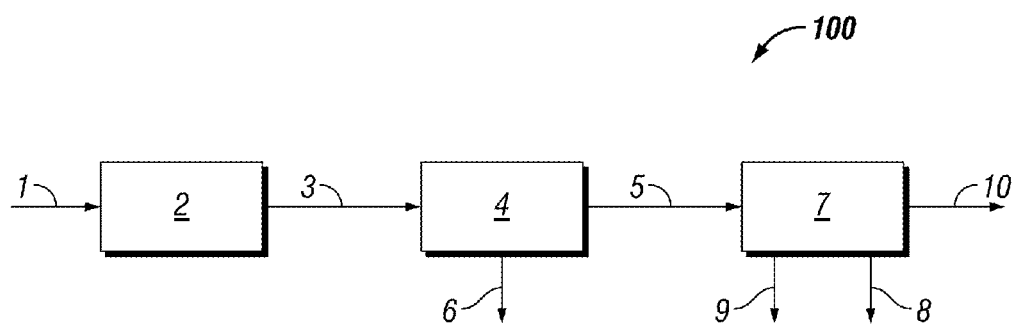
FIG. 1A is a block flow diagram of the synthesis gas production portion of a synthetic fuels production plant.
Figure 1B:
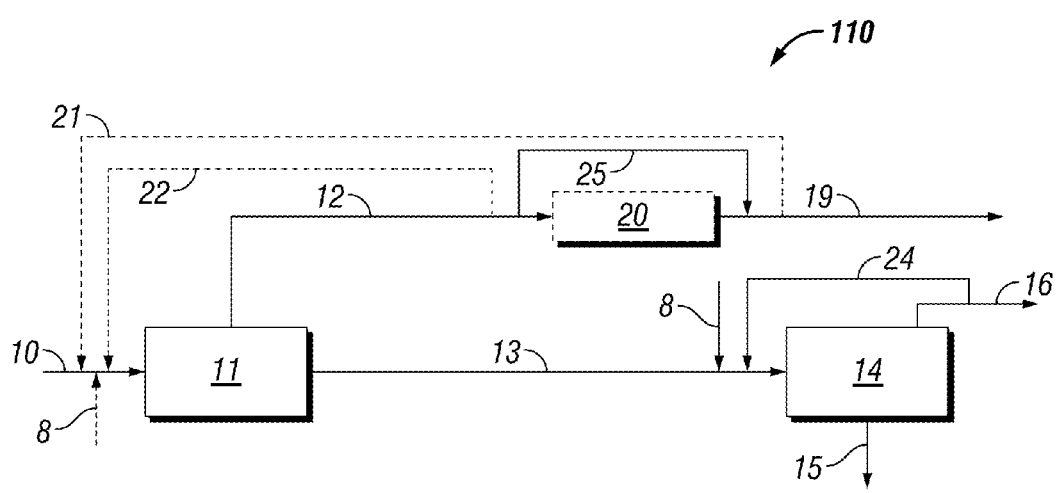
FIG. 1B is a block flow diagram of the Fischer-Tropsch reaction and downstream processing portion of a synthetic fuels production plant.

FIGS. 1A-1B illustrate a typical block flow diagram of a synthetic fuels production system using carbonaceous materials as primary feedstocks. As shown in FIG. 1A, which depicts the synthesis gas production portion 100 of a synthetic fuels production plant, synthesis gas reactor 2 comprises an inlet line 1 for a carbonaceous feedstream comprising one or more suitable carbonaceous material. For example, the carbonaceous feedstream may comprise natural gas, coal, bio-waste, bio-mass, etc. Suitable biomass may comprise municipal solid waste (MSW), sludge/sewer sludge, by-products of the lumber industry, etc. Synthesis gas reactor 2 is adapted for the production of unrefined synthesis gas from the carbonaceous materials, which unrefined synthesis gas is extracted from synthesis gas reactor 2 via line 3. Line 3 is fluidly connected with an inlet of refining/clean-up unit 4. Refining/cleanup unit 4 may be any unit from which at least one undesired component may be removed, via line 6, from a refined hydrogen-rich synthesis gas stream, which exits refining/clean-up unit 4 via line 5. Refining/clean-up unit 4 may be one or more units, for example, acid gas removal units. The at least one undesirable component or impurity may be ash elements, sulfur-containing components, halogen-containing components, ammonia, HCN, and other impurities that may be harmful for processes downstream the gasification/conversion section.

Line 5 may be fluidly connected with an inlet of one or more hydrogen extraction unit 7, whereby refined hydrogen-rich synthesis gas may be introduced into one or more hydrogen extraction units 7. Hydrogen extraction unit(s) 7 may comprise one or more membrane units, one or more pressure swing adsorption (PSA) units, or a combination thereof. Other processing units known to those of skill in the art for gas separations may also be used. For example, hydrogen extraction unit(s) 7 may also include without limitation, cryogenic distillation units and absorption units. Hydrogen extraction units 7 are adapted to remove excess hydrogen from the refined synthesis gas product to produce an adjusted synthesis gas product, which exits hydrogen extraction unit(s) 7 via line(s) 10. One or more lines 8 may be used to extract hydrogen-rich product from the hydrogen extraction unit(s) 7, and one or more lines 9 may be used to extract hydrogen-lean product from hydrogen extraction unit(s) 7. The enriched hydrogen streams extracted from hydrogen extraction unit(s) 7 may be utilized for downstream processes, including but not limited to Fischer-Tropsch catalyst activation processes, Fischer-Tropsch reaction process, and product upgrading processes, as further discussed hereinbelow.

The one or more adjusted synthesis gas stream 10 may have an $H_2/CO$ ratio within a range suitable for Fischer-Tropsch reactions (which may occur in one or more Fischer-Tropsch reactors 11 depicted in FIG. 1B). In other words, hydrogen-rich stream(s) in line(s) 8 and hydrogen-lean stream(s) in line(s) 9 may be separated from the adjusted synthesis gas stream(s) 10 via one or more hydrogen extraction units 7. The term 'hydrogen rich' with respect to stream 8 refers to the fact that hydrogen-rich stream(s) 8 comprises a greater percentage of hydrogen than hydrogen-lean stream(s) 9. 'Hydrogen-rich' streams may have at least about 50% hydrogen by volume, and may have at least about 70% or at least about 80% hydrogen by volume. 'Hydrogen-lean' streams may have no more than about 50% hydrogen by volume, no more than about 60% hydrogen by volume, or no more than about 70% hydrogen by volume.

FIG. 1B is a process flow diagram of a portion 110 of a typical Fischer-Tropsch (FT) process wherein synthesis gas is converted into liquid hydrocarbons. Hydrocarbon synthesis reactor 11 is adapted for the production of liquid hydrocarbons from synthesis gas. Hydrocarbon synthesis reactor(s) 11 comprises one or more inlets for synthesis gas. An inlet to hydrocarbon synthesis reactor 11 may be fluidly connected with one or more lines 10 from hydrogen extraction unit(s) 7 such that adjusted synthesis gas produced in hydrogen extraction unit(s) 7 may be fed into hydrocarbon synthesis reactor(s) 11. In embodiments, an outlet 8 of hydrogen extraction unit(s) 7 is fluidly connected with an inlet of the hydrocarbon synthesis reactor(s) 11 whereby a portion of the hydrogen-rich product extracted from the hydrogen extraction unit(s) may be introduced into the hydrocarbon synthesis reactor(s) 11.

Fischer-Tropsch Catalyst

In embodiments, the hydrocarbon synthesis reactor(s) 11 comprises catalyst effective for catalyzing the conversion of carbon monoxide and hydrogen into $C^{2+}$ hydrocarbons. The FT catalyst may comprise any FT catalyst known to those of skill in the art. Examples of Fischer-Tropsch catalysts that may be used in conjunction with the process include without limitation, catalysts comprising nickel, cobalt, iron, ruthenium, or combinations thereof In embodiments, the Fischer-Tropsch catalyst is a metal-based catalyst. In specific embodiments, the Fischer-Tropsch catalyst is an iron-based catalyst. In embodiments, the FT catalyst is a cobalt-based catalyst. Most preferably, the Fischer-Tropsch catalyst is an iron carbide catalyst.

Depending on the preselected alpha, i.e., the polymerization probability desired, a precipitated iron catalyst may have a weight ratio of potassium (e.g., as carbonate) to iron in the range of from about 0.005 and about 0.015, more preferably in the range of from 0.0075 to 0.0125, and most preferably about 0.010. Larger amounts of alkali metal promoter (e.g., potassium) may cause the product distribution to shift toward the longer-chain molecules, while small amounts of alkali metal may result in a predominantly gaseous hydrocarbon product.

The weight ratio of copper to iron in the iron Fischer-Tropsch catalyst may be in the range of from about 0.005 and 0.050, more preferably in the range of from about 0.0075 and 0.0125, and most preferably about 0.010. Copper may serve as an induction promoter. In preferred embodiments, the weight ratio of Cu:Fe is about 1:100.

The catalyst may be an iron Fischer-Tropsch catalyst comprising structural promoter. The structural promoter may significantly reduce the breakdown of the catalyst in a SBCR (slurry bubble column reactor). The structural promoter may comprise silica, and may enhance the structural integrity during activation and operation of the catalyst. In embodiments, the catalyst comprises a mass ratio of $SiO_2$:Fe of less than about 1:100 when the structural promoter comprises silica and less than about 8:100 when the structural promoter comprises silica sol.

In embodiments, the at least one structural promoter is selected from oxides of metals and metalloids and combinations thereof. The structural promoter may be referred to as a binder, a support material, or a structural support.

Depending on the level of structural promoter comprising silicate and the preselected alpha, i.e. the polymerization probability desired, the weight ratio of K:Fe may be from about 0.5:100 to about 6.5:100. More preferably, the weight ratio of K:Fe is from about 0.5:100 to about 2:100. In some embodiments, the weight ratio of K:Fe is about 1:100.

In some embodiments wherein the structural promoter comprises silica sol, the weight ratio of iron to potassium is in the range of from about 100:1 to about 100:5. In some embodiments, the weight ratio of iron to potassium is in the range of from about 100:2 to about 100:6. In more preferred embodiments, the weight ratio of iron to potassium is in the range of from about 100:3 to about 100:5. In some embodiments, the weight ratio of iron to potassium is in the range of from about 100:4 to about 100:5. In some preferred embodiments, the weight ratio of iron to potassium is in the range of from about 100:2 to about 100:4. In some specific embodiments, the weight ratio of iron to potassium about 100:3. In other certain embodiments, the weight ratio of iron to potassium is about 100:5.

In embodiments wherein the structural promoter comprises silica sol, the weight ratio of iron to copper may be in the range of from about 100:1 to about 100:7. In some embodiments, the weight ratio of iron to copper is in the range of from about 100:1 to about 100:5. More preferably, the weight ratio of iron to copper is in the range of from about 100:2 to about 100:6. Still more preferably, the weight ratio of iron to copper is in the range of from about 100:3 to about 100:5. In some preferred embodiments, the weight ratio of iron to copper is in the range of from about 100:2 to about 100:4. In other specific embodiments, the weight ratio of iron to copper is about 100:5. In yet other specific embodiments, the weight ratio of iron to copper is about 100:3.

Broadly, in embodiments, wherein the structural promoter is silica sol, the iron to $SiO_2$ weight ratio may be in the range of from about 100:1 to about 100:8; alternatively, in the range of from 100:1 to 100:7. More preferably, in some embodiments, wherein the structural promoter is silica, the iron to $SiO_2$ weight ratio may be in the range of from about 100:2 to about 100:6. Still more preferably, the weight ratio of iron to silica is in the range of from about 100:3 to about 100:5. In some preferred embodiments, wherein the structural promoter is silica, the iron to $SiO_2$ weight ratio is about 100:5. In embodiments, wherein the structural promoter is silica, the iron to $SiO_2$ weight ratio may be in the range of from about 100:3 to about 100:7; alternatively, in the range of from about 100:4 to about 100:6. In some preferred embodiments, the Fe:Cu:K:$SiO_2$ mass ratio is about 100:4:3:5.

Hydrocarbon synthesis reactor(s) 11 comprises an outlet for byproducts of the Fischer-Tropsch reactions, including but not limited to carbon dioxide, unconverted carbon monoxide, water, hydrogen, methane, ethane, and the like. Line 12 may remove such byproducts from hydrocarbon synthesis reactor(s) 11. In embodiments, line 12 may introduce gas byproducts into carbon dioxide removal unit 20. Carbon dioxide removal unit 20 may be adapted extract carbon dioxide from the gas byproducts produced in hydrocarbon synthesis reactor 11, yielding a first gas byproduct comprising carbon monoxide and hydrogen which may exit carbon dioxide removal unit 20 via line 19. Alternatively, as shown by line 25, no carbon dioxide unit 20 may be utilized in certain embodiments. As indicated in FIG. 1B, lines 21 and 22 may fluidly connect lines 19 and 12 respectively with an inlet of hydrocarbon synthesis reactor(s) 11.

Referring again to FIG. 1B, line 13 may fluidly connect hydrocarbon synthesis reactor(s) 11 with one or more product upgrading unit(s) 14. Liquid product in line 13 from Fischer-Tropsch reactor(s) 11 comprise Fischer-Tropsch liquid hydrocarbon products, including, without limitation, paraffins, olefins, and oxygenated components (e.g., alcohols, organic acids, etc.). Processing and/or product upgrade unit(s) 14 may be utilized for further refinement, separation, and/or purification of the liquid product produced in hydrocarbon synthesis reactor(s) 11. Product upgrading unit(s) 14 may comprise separators, hydrogenation units, hydro-crackers, isomerization units, hydro-isomerization units, and combinations thereof. Final liquid synfuels products stream(s) may be extracted from product upgrading unit(s) 14 via line(s) 15. The final liquid synfuels products in stream(s) 13 and/or 15 may also be used as lubricants, or as products referred to as base oils. Final liquid hydrocarbon products in line 15 may comprise, without limitation, diesel, jet fuel, naphtha, and LPG. Hydrogen-rich gas byproducts separated from liquid hydrocarbon Fischer-Tropsch products in stream 15 via product upgrading unit(s) 14 may be removed via second gas byproduct stream(s) 16 as depicted in FIG. 1B. Second gas byproduct stream(s) 16 is generally a hydrogen-rich stream. Line 24 may serve to recycle a portion of second gas byproduct stream to the one or more product upgrading units 14, as indicated in FIG. 1B.

Figure 2A:
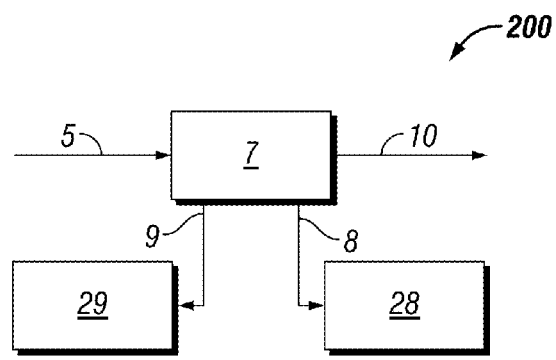
FIG. 2A is a block diagram depicting conventional utilization of hydrogen-rich and hydrogen-lean streams produced in hydrogen extraction units of a synthetic fuels production plant.

FIG. 2A is a block diagram depicting conventional utilization 200 of hydrogen-rich stream(s) and hydrogen-lean stream(s) produced in hydrogen extraction unit(s) 7 of a synthetic fuels production plant. As indicated, line(s) 9 conventionally connect hydrogen extraction unit(s) 7 with fuel system 29. Power and/or steam may be produced via system 29. The steam is used in different parts of the plant for various purposes or for export and/or heat of combustion of these streams is sometimes used for heat input to any equipment/process appropriate in the plant. Line(s) 8 conventionally connect hydrogen extraction unit(s) 7 with product upgrading units, as indicated in the flow diagram of FIG. 1B and/or are with hydrocarbon synthesis reactors, as also indicated in FIG. 1B. Box 28 of FIG. 2A thus represents either hydrocarbon synthesis reactor(s), product upgrading unit(s), or a combination thereof.

Figure 3A:
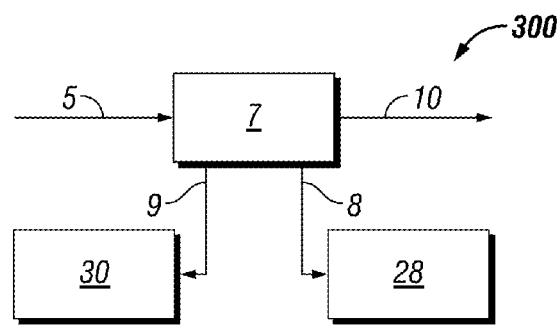
FIG. 3A is a block diagram depicting utilization, according to an embodiment of this invention, of hydrogen-rich and hydrogen-lean streams produced in hydrogen extraction units of a synthetic fuels production plant.
Figure 4:
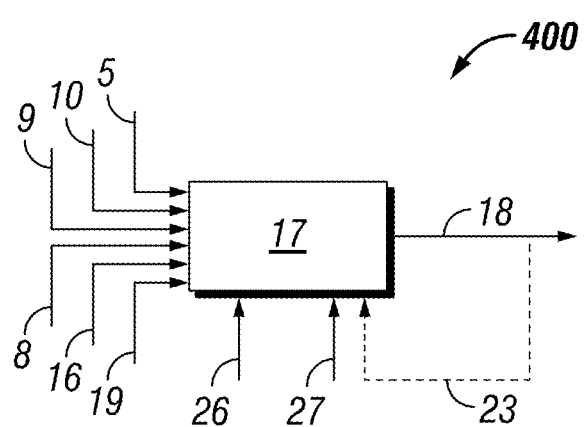
FIG. 4 is a schematic of a hydrocarbon synthesis/catalyst activation or re-activation system according to an embodiment of the invention, depicting the usage of various synthesis gas, hydrogen-rich, and hydrogen-lean streams produced as indicated in FIGS. 3A-3C.

FIG. 3A is a block diagram depicting utilization, according to an embodiment 300 of this invention, of hydrogen-rich gas stream(s) in line(s) 8 and hydrogen-lean gas stream(s) in line(s) 9 produced in hydrogen extraction unit(s) 7 of a synthetic fuels production plant. According to this disclosure, rather than being sent to fuel system 29, line(s) 9 carrying hydrogen-lean gas fluidly connect hydrogen extraction unit(s) 7 with one or more hydrocarbon synthesis reactor or catalyst activation reactor (for fresh catalyst activation and/or spent catalyst re-activation), as indicated by box 30. Thus, box 30 represents one or more hydrocarbon synthesis reactor 11 or a catalyst activation (or re-activation) reactor 17 as depicted in FIG. 4 and further described hereinbelow.

Figure 2B:
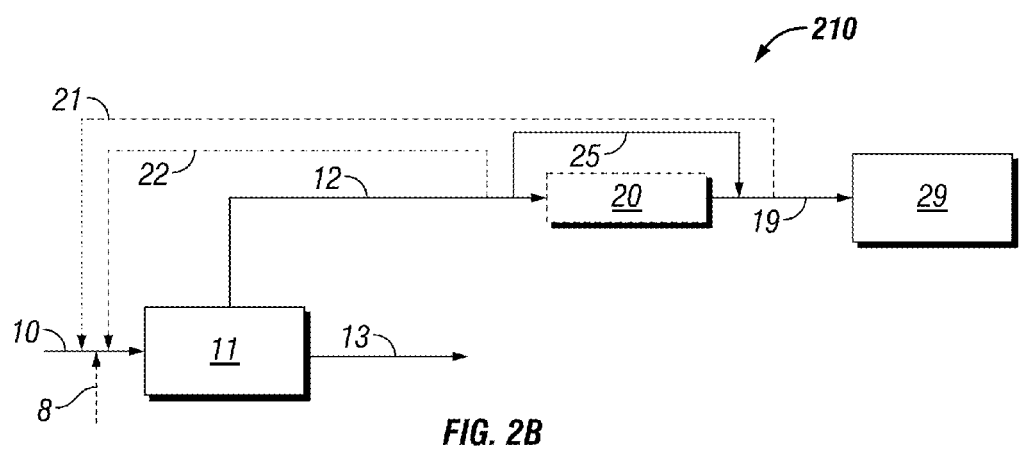
FIG. 2B is a block flow diagram depicting conventional utilization of synthesis gas separated from gas products exiting a hydrocarbon synthesis reactor of a synthetic fuels production plant.

FIG. 2B is a block flow diagram depicting conventional utilization 210 of first gas byproduct stream(s) 19 separated from gas products 12 exiting a hydrocarbon synthesis reactor(s) 11 of a synthetic fuels production plant. As indicated in FIG. 2B, line(s) 19 conventionally serve to introduce first byproduct gas into a fuel system 29 for power production.

Figure 3B:
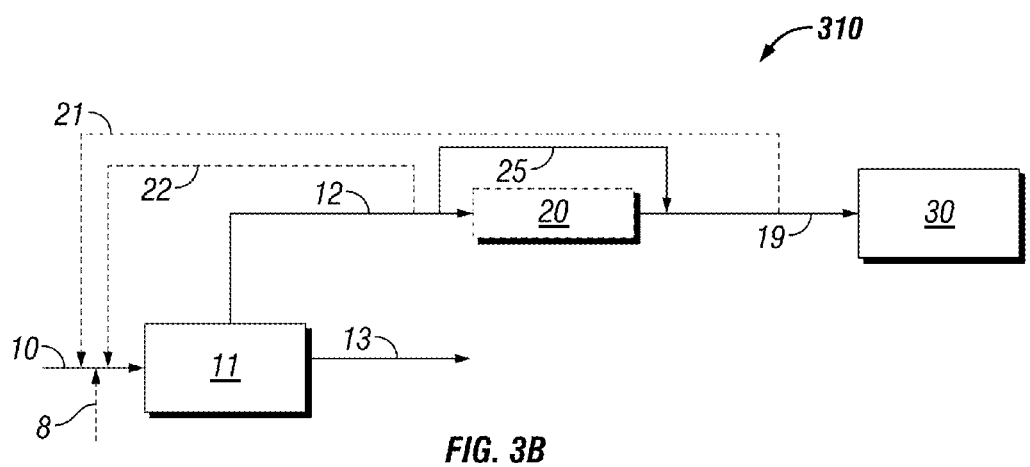
FIG. 3B is a block flow diagram depicting utilization, according to an embodiment of this invention, of synthesis gas separated from gas products exiting a hydrocarbon synthesis reactor of a synthetic fuels production plant.

FIG. 3B is a block flow diagram depicting utilization, according to an embodiment 310 of this invention, of synthesis gas in first gas byproduct separated via line(s) 19 from gas products 12 exiting a hydrocarbon synthesis reactor(s) 11 of a synthetic fuels production plant. According to this disclosure, at least a portion of first gas byproduct in line(s) 19 is introduced into one or more hydrocarbon synthesis reactors or catalyst activation reactors as indicated by box 30. Thus, reactor 30 may be one or more hydrocarbon synthesis reactor 11 or one or more catalyst activation or re-activation reactor 17 as depicted in FIG. 4 and further described hereinbelow.

Figure 2C:
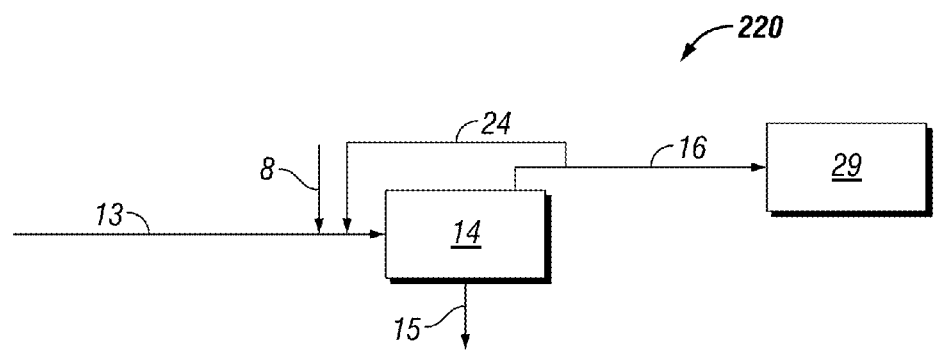
FIG. 2C is a block flow diagram depicting conventional utilization of hydrogen-rich gas products separated from hydrocarbon liquid fuels in product upgrading units of a synthetic fuels production plant.

FIG. 2C is a block flow diagram depicting conventional utilization 220 of hydrogen-rich second gas byproduct in line(s) 16 separated from hydrocarbon liquid products 15 in product upgrading unit(s) 14 of a synthetic fuels production plant. As indicated in FIG. 2C, line(s) 16 conventionally serve to introduce hydrogen-rich second gas byproduct into a fuel system 29 for the production of plant power.

Figure 3C:
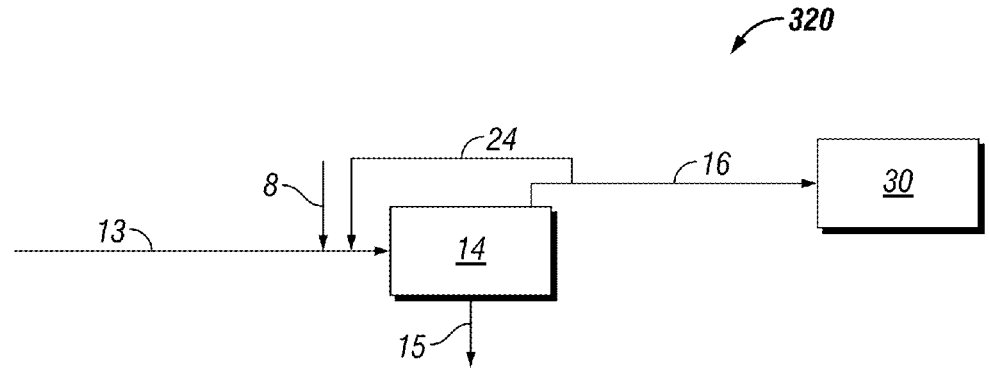
FIG. 3C is a block flow diagram depicting utilization, according to an embodiment of this invention, of hydrogen-rich gas products separated from hydrocarbon liquid fuels in product upgrading units of a synthetic fuels production plant.

FIG. 3C is a block flow diagram depicting utilization, according to an embodiment 320 of this invention, of hydrogen-rich second gas in line(s) 16 separated from hydrocarbon liquid products in line(s) 15 via product upgrading unit(s) 14 of a synthetic fuels production plant. According to this embodiment, line(s) 16 is fluidly connected with one or more hydrocarbon synthesis reactors or catalyst activation reactors as indicated by box 30, whereby at least a portion of second gas byproduct in line(s) 16 may be introduced into one or more hydrocarbon synthesis reactors or catalyst activation reactors 30. Thus, at least a portion of second gas byproduct in line(s) 16 may be introduced into a hydrocarbon synthesis reactor 11 or a catalyst activation or re-activation reactor 17 as depicted in FIG. 4 and further described hereinbelow.

Method of Using $H_2$-Lean Gas for Catalyst Activation in Synthetic Fuels Production Plants As shown in FIG. 1A, which depicts the synthesis gas production portion 100 of a synthetic fuels production plant, carbonaceous materials in line 1 are introduced into a syngas reactor 2 from carbonaceous materials inlet line 1. Within syngas reactor 2, carbonaceous material is converted into synthesis gas. The resulting unrefined synthesis gas exits syngas reactor 2 via line 3. The synthesis gas exiting via line 3 may comprise a mixture of carbon monoxide, carbon dioxide, carbon, water, hydrogen, methane, and other hydrocarbons, sulfur containing components, and other molecules. Depending on the nature of the starting carbonaceous material and the gasification/conversion process used to generate the synthesis gas, unrefined synthesis gas in line 3 may have a mole ratio of hydrogen to carbon monoxide in the range of from about 0.25 to about 4, from about 0.5 to about 3, or from about 0.7 to about 1.4. Unrefined synthesis gas in line 3 may then be introduced into synthesis gas refining/clean-up unit(s) 4 for removal of undesirable compounds such as ash elements, sulfur-containing components, halogen-containing components, ammonia, HCN, and other impurities that may be harmful for processes downstream the gasification/conversion section. Undesired components may be removed from clean-up unit(s) 4 via line 6. Refined hydrogen-rich synthesis gas may be removed from clean-up unit(s) 4 via line(s) 5. The refined hydrogen-rich synthesis gas may be introduced into one or more hydrogen extraction unit(s) 7.

Streams exiting hydrogen extraction unit(s) 7 may include one or more hydrogen-lean stream in line(s) 9, one or more hydrogen-rich stream(s) in line(s) 8 and one or more adjusted synthesis gas streams in line(s) 10. The one or more adjusted synthesis gas streams in line(s) 10 may have an $H_2/CO$ ratio within a range suitable for introduction in Fischer-Tropsch reactions, and may thus be introduced into one or more Fischer-Tropsch reactors 11, as depicted in FIG. 1B. 'Hydrogen-rich' stream(s) in line(s) 8 may comprise at least about 50% hydrogen by volume, and may have at least about 80% hydrogen by volume. 'Hydrogen-lean' stream(s) in line(s) 9 may comprise no more than about 50% hydrogen by volume.

As depicted in FIG. 1B, adjusted synthesis gas product in line(s) 10 may be introduced into one or more hydrocarbon synthesis reactors 11. Hydrocarbon synthesis reactor(s) 11 are operated for the production of liquid hydrocarbons from the synthesis gas fed thereto. Byproducts of the Fischer-Tropsch reactions such as carbon dioxide, unconverted carbon monoxide, water, hydrogen, methane, ethane, and the like may be removed from Fischer-Tropsch reactor(s) 11 via gas stream 12. In embodiments, gas stream 12 is introduced into carbon dioxide removal unit 20 to form a first gas byproduct stream 19. Alternatively, as shown by line 25, gas stream 12 is not introduced into a carbon dioxide removal unit 20.

Referring again to FIG. 1B, liquid hydrocarbon product in line(s) 13 from Fischer-Tropsch reactor(s) 11 comprises Fischer-Tropsch liquid hydrocarbon products, including, without limitation, paraffins, olefins, and oxygenated components (e.g., alcohols, organic acids, etc.). Liquid products in stream(s) 13 may be sent to processing and/or product upgrade unit(s) 14 for further refinement, separation, and/or purification. Final liquid synfuels products stream(s) may be extracted from product upgrading unit(s) 14 via line(s) 15. The liquid synfuels products may also be used as lubricants, or as products referred to as base oils. Final liquid hydrocarbon products in line 15 may comprise, without limitation, diesel, jet fuel, naphtha, and LPG. Hydrogen-rich gas byproducts separated from liquid hydrocarbon Fischer-Tropsch products via product upgrading unit(s) 14 may be removed via second gas byproduct line(s) 16 as depicted in FIG. 1B. Second gas byproduct stream(s) 16 is generally a hydrogen-rich stream.

Referring now to FIG. 3A, which is a block diagram depicting utilization, according to an embodiment 300 of this invention, of hydrogen-rich gas in line(s) 8 and hydrogen-lean gas in line(s) 9 produced in hydrogen extraction unit(s) 7 of a synthetic fuels production plant. According to this disclosure, rather than being sent to fuel system 29, hydrogen-lean gas in line(s) 9 is introduced into one or more hydrocarbon synthesis reactors or catalyst activation reactors (for fresh catalyst activation and/or spent catalyst re-activation), as indicated by box 30. Thus, reactor 30 may be a hydrocarbon synthesis reactor 11 or a catalyst activation (or re-activation) reactor 17 as depicted in FIG. 4 and further described hereinbelow.

Referring now to FIG. 3B, which is a block flow diagram depicting utilization, according to an embodiment 310 of this invention, of synthesis gas in first gas byproduct in line(s) 19 separated from gas products 12 exiting a hydrocarbon synthesis reactor(s) 11 of a synthetic fuels production plant. According to this disclosure, at least a portion of first gas byproduct in line(s) 19 is introduced into one or more hydrocarbon synthesis reactors or catalyst activation reactors as indicated by box 30. Thus, reactor 30 may be a hydrocarbon synthesis reactor 11 or a catalyst activation or re-activation reactor 17 as depicted in FIG. 4 and further described hereinbelow.

Referring now to FIG. 3C, which is a block flow diagram depicting utilization, according to an embodiment 320 of this invention, of hydrogen-rich second gas byproduct in line(s) 16 separated from hydrocarbon liquid products in stream(s) 15 via product upgrading unit(s) 14 of a synthetic fuels production plant. According to this embodiment, at least a portion of second gas byproduct in line(s) 16 is introduced into one or more hydrocarbon synthesis reactors or catalyst activation reactors as indicated by box 30. Thus, at least a portion of second gas byproduct stream(s) 16 is introduced into a hydrocarbon synthesis reactor 11 or a catalyst activation or re-activation reactor 17 as depicted in FIG. 4 and further described hereinbelow.

Whereas, conventionally, streams such as hydrogen-lean gas in line(s) 9, second gas byproduct in line(s) 16 and first gas byproduct in line(s) 19 are sent to a fuel system 29 as fuel for the process plant as seen in FIGS. 2A-2C, according to this disclosure, these streams may be utilized for further hydrocarbon synthesis by introduction into one or more hydrocarbon synthesis reactors and/or introduction into one or more activation reactors, as indicated in FIGS. 3A-3C. Accordingly, hydrogen-lean stream(s) 9, first byproduct synthesis gas stream(s) 19, and/or second byproduct gas stream(s) 16 may used in other potentially more useful processes than just as combustible fuel in the production of power.

FIG. 4 is a schematic of an embodiment of an activation system 400 for activation of fresh catalyst and/or re-activation of spent catalyst. In this embodiment, activation system 400 comprises one or more activation reactor(s) 17, which may also be hydrocarbon synthesis reactors. That is, activation reactors 17 may comprise dedicated activation vessels or hydrocarbon synthesis reactors in which catalyst activation is performed in situ. Fresh catalyst may be introduced into the activation reactor(s) 17 via fresh catalyst line 26. Spent catalyst may be introduced into activation reactor(s) 17 via line 27. A portion of the gas exiting activation reactor(s) 17 may be recycled as indicated to activation reactor(s) 17 via recycle line 23. The number and arrangement of reactors 17 may depend upon the total production of the synfuels plant and the sizes of the activation reactors 17. Activation reactors 17 may be arranged in series and/or in parallel.

According to this disclosure, activation of catalyst is performed by adjusting the process conditions of the activation process(es) (i.e., the temperature, pressure, feed gas composition, number of steps and duration of steps) such that refined hydrogen-rich synthesis gas in line(s) 5, hydrogen-rich synthesis gas in line(s) 8, hydrogen-lean synthesis gas in line(s) 9, adjusted synthesis gas in line(s) 10, second gas byproduct gas in line(s) 16 and/or first gas byproduct in line(s) 19 may be utilized, as indicated in FIG. 4, to achieve and/or maintain a targeted fresh catalyst activation level or spent catalyst re-activation level. The use of various feed streams (having various hydrogen to carbon monoxide ratios) as activating gas in activation reactor(s) 17 may be optimized to activate a catalyst at conditions whereby the catalyst attrition is reduced.

In some embodiments, catalyst activation or re-activation is performed in dedicated activation reactor(s) 17 which is (are) distinct from the hydrocarbon synthesis reactor(s) 11 used for Fischer-Tropsch reaction. In such instances, the activated or re-activated catalyst can be transferred to/from these different vessels as desired. In other embodiments, activation or re-activation is performed in situ within a hydrocarbon synthesis reactor, in which case activation reactor(s) is a hydrocarbon synthesis reactor(s) 11.

In embodiments, hydrogen-lean gas in line(s) 9 from the one or more hydrogen extraction unit(s) 7 has a hydrogen to carbon monoxide ratio that is less than the hydrogen to carbon monoxide ratios in the hydrogen-rich gas in line(s) 8 and adjusted synthesis gas in line(s) 10. For instance, in embodiments in which hydrogen extraction unit(s) 7 comprise a conventional hydrogen membrane in combination with a pressure swing adsorption unit, a hydrogen-rich gas in line(s) 8 may have a $H_2/CO$ ratio of at least about 10, alternatively at least about 15, or alternatively at least about 20. Hydrogen-lean gas in line(s) 9 may have a $H_2/CO$ ratio of no more than about 2, alternatively, no more than about 1. Hydrogen-lean gas in line(s) 9 may be used for steps in activation processes for which hydrogen to carbon monoxide ratios of less than 2 or less than 1 are desirable, as discussed further hereinbelow. Hydrogen-lean gas in line(s) 9 may also contain a level of inerts (i.e. nitrogen and/or methane) appropriate for those activation steps calling for diluted activation gas. Furthermore, hydrogen-lean gas in line(s) 9 may comprise less than about 50% hydrogen by volume, less than about 40% hydrogen by volume, or less than about 30% hydrogen by volume. Hydrogen-rich gas in line(s) 8 may be used for some of the steps of a Fischer-Tropsch catalyst activation process for which such hydrogen-rich gas is desirable. The hydrogen-rich activation steps may be prior to or subsequent activation steps for which hydrogen-lean gas is desirable. The effects sought by using a hydrogen-rich gas in line(s) 8 and/or hydrogen-lean gas in line(s) 9 in different sequences and/or under different or similar operating conditions (temperature and pressure) are more effectively activated catalyst and/or reduced chemical attrition of the catalyst relative to an otherwise more severe activation process.

The hydrogen to carbon monoxide ratios of refined hydrogen-rich synthesis gas in line(s) 5 and adjusted synthesis gas in line(s) 10 depend upon the nature of the starting carbonaceous materials and the gasification/conversion process(es) used to generate these streams. Refined hydrogen-rich synthesis gas in line(s) 5 and adjusted synthesis gas in line(s) 10 may comprise hydrogen and carbon monoxide in a molar ratio in the range of from about 0.5 to about 3, more typically in the range of from about 0.7 to about 1.4. All or portions of these refined hydrogen-rich synthesis gas stream(s) in line(s) 5 and adjusted synthesis gas stream(s) in line(s) 10 may be utilized in steps of a catalyst activation process for which such hydrogen to carbon monoxide ratios are appropriate.

In embodiments, hydrogen-rich stream(s) in line(s) 8 and second gas byproduct stream(s) in line(s) 16 comprise at least about 50% hydrogen by volume, or alternatively at least about 90% hydrogen by volume. These streams may be used for activation process steps in which high hydrogen contents (i.e. $H_2/CO$ ratios greater than about 2, alternatively greater than about 3, 4, or 5) are desired.

In embodiments, for example, an iron-based catalytic system for hydrocarbon synthesis, first gas byproduct in line(s) 19 may comprise hydrogen and carbon monoxide in a ratio higher than the synthesis gas feed (stream 10 plus optional recycle streams 21 and 22 and optional hydrogen-rich gas in line 8) to hydrocarbon synthesis reactor 11. Thus, first gas byproduct in line(s) 19 may be considered a 'hydrogen-rich' stream or a synthesis gas stream suitable for utilization in catalyst activation processes as well. In embodiments wherein Fe-based catalyst(s) is (are) utilized in the hydrocarbon synthesis reactor(s) 11, the activation processes may be performed in a single step using a substantially constant hydrogen to carbon monoxide ratio. Alternatively, catalyst activation may be performed in a plurality of steps utilizing hydrogen-rich feed stream(s) in the initial steps to reduce the iron oxides and hydrogen-lean or carbon monoxide-rich stream(s) in later steps to produce iron carbide, the main component attributed for catalyst activity.

In an embodiment, re-activation comprises placing a hydrocarbon synthesis reactor 11 under re-activation conditions periodically to re-gain a portion of the activity lost over a certain period of time. By doing this, the de-activation rate may be decreased over time requiring less catalyst replacement and potentially leading to economic benefits including reduced catalyst costs, reduced fresh catalyst initial activation costs and/or reduced catalyst/wax separation equipment costs and/or operating expenses.

The catalyst activation process may comprise a continuous catalyst replacement process with a periodic re-activation method where the re-activation conditions are similar or less severe than the reaction conditions, obtaining a partial re-activation that slows down the de-activation rate decreasing the catalyst replacement rate and extending the catalyst life. The process may comprise operating a hydrocarbon synthesis reactor system at the following reaction conditions: between 200° C. and 300° C., preferably between 220° C. and 280° C.; between about 250 psig and about 500 psig and preferably between about 300 and about 450 psig with a feed stream comprising a hydrogen to carbon monoxide mole ratio of 0.5 to 2.0 and preferably between 0.7 and 1.4. The re-activation conditions may comprise: placing a reactor under these conditions with a frequency in the range of from about 2 days to about 360 days, from about 7 days to about 180 days, or in the range of from about 14 days to about 90 days. The re-activation process conditions may be less severe than reaction conditions in terms of temperature and pressure, with re-activation conditions being in the range of from about 180° C. to about 280° C. and a pressure in the range of from about 15 psia and about 200 psia or between about 30 psia and about 150 psia.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term 'optionally' with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A system for activation of hydrocarbon synthesis catalyst, the system comprising:
   at least one hydrogen extraction unit adapted to remove at least one hydrogen-rich gas and at least one hydrogen-lean gas from a synthesis feedgas to yield a refined synthesis gas, wherein the at least one hydrogen extraction unit comprises an inlet for the synthesis feedgas from a synthesis feedgas line, at least one outlet for the at least one hydrogen-rich gas, at least one outlet for the at least one hydrogen-lean gas, and an outlet for the refined synthesis gas; and
   an activation reactor operable to activate hydrocarbon synthesis catalyst, wherein the activation reactor comprises an inlet fluidly connected with the at least one hydrogen extraction unit via the at least one outlet for the at least one hydrogen-lean gas, whereby at least a portion of the at least one hydrogen-lean gas is introduced into the activation reactor.

2. The system of claim 1 further comprising at least one hydrocarbon synthesis reactor configured to produce liquid hydrocarbons and a first byproduct gas from a synthesis gas reactor feedstream comprising at least a portion of the refined synthesis gas, wherein the at least one hydrocarbon synthesis reactor is fluidly connected with the at least one hydrogen extraction unit via the outlet for the refined synthesis gas, whereby at least a portion of the refined synthesis gas may be introduced into the hydrocarbon synthesis reactor, and wherein the at least one hydrocarbon synthesis reactor comprises a hydrocarbon synthesis reactor tailgas outlet line configured for removal of the first byproduct gas therefrom.

3. The system of claim 2 wherein the at least one hydrocarbon synthesis reactor is fluidly connected, via the hydrocarbon synthesis reactor tailgas outlet line, with the activation reactor whereby at least a portion of the first byproduct gas may be utilized for catalyst activation.

4. The system of claim 3 further comprising at least one product upgrading unit fluidly connected with the at least one hydrocarbon synthesis reactor, wherein the at least one product upgrading unit is configured to upgrade at least a portion of the liquid hydrocarbons, thus producing upgraded liquid hydrocarbons and a second gas byproduct, and wherein the at least one product upgrading unit comprises a product upgrading unit tailgas outlet line for extraction of the second gas byproduct therefrom.

5. The system of claim 4 wherein the at least one product upgrading unit is selected from the group consisting of hydroisomerization units, isomerization units, separators, hydrocrackers, and hydrogenation units.

6. The system of claim 4 wherein the product upgrading unit tailgas outlet line is fluidly connected with an inlet of the activation reactor whereby at least a portion of the second gas byproduct may be utilized for catalyst activation.

7. The system of claim 6 wherein the activation reactor is fluidly connected with the synthesis feedgas line, the hydrogen extraction unit, or both, whereby at least a portion of the synthesis feedgas, at least a portion of the refined synthesis gas, or both may be introduced into the activation reactor.

8. The system of claim 1 wherein the at least one hydrogen extraction unit is selected from the group consisting of membrane separation units and pressure swing adsorption units.

9. The system of claim 1 wherein the activation reactor is a hydrocarbon synthesis reactor.

10. The method of claim 9 wherein the hydrocarbon synthesis reactor is a Fischer-Tropsch reactor.

11. The system of claim 1 wherein the hydrocarbon synthesis catalyst is selected from the group consisting of iron-based Fischer-Tropsch catalysts, cobalt-based Fischer-Tropsch catalysts, and combinations thereof.

12. The system of claim 1 wherein the at least one hydrogen extraction unit is configured to provide a hydrogen-rich gas having a molar ratio of hydrogen to carbon monoxide in the range of greater than about 10.

13. The system of claim 1 wherein the at least one hydrogen extraction unit is configured to provide a hydrogen-lean gas having a molar ratio of hydrogen to carbon monoxide ratio of less than about 2.

14. The system of claim 1 wherein the outlet for refined synthesis gas of the at least one hydrogen extraction unit is fluidly connected with the activation reactor whereby at least a portion of the refined synthesis gas may be introduced thereto and utilized for catalyst activation.

15. A system for activation of hydrocarbon synthesis catalyst, the system comprising:
at least one hydrogen extraction unit comprising an inlet for a synthesis feedgas from a synthesis feedgas line and adapted to remove at least one hydrogen-rich gas, via at least one hydrogen-rich gas outlet, and at least one hydrogen-lean gas, via at least one hydrogen-lean gas outlet, from the synthesis feedgas to yield a refined synthesis gas; and
at least one hydrocarbon synthesis reactor fluidly connected with the at least one hydrogen extraction unit and configured to provide liquid hydrocarbons and a first byproduct gas, extracted therefrom via a hydrocarbon synthesis reactor tailgas outlet line, from a synthesis reactor feedstream comprising at least a portion of the refined synthesis gas; and
at least one activation reactor configured for activation of hydrocarbon synthesis catalyst via an activation gas, wherein the at least one activation reactor is fluidly connected with the at least one hydrocarbon synthesis reactor via the hydrocarbon synthesis reactor tailgas outlet line, whereby at least a portion of the first byproduct gas may be utilized as the activation gas, and connected with the at least one hydrogen extraction unit via the at least one hydrogen-lean gas outlet, whereby at least a portion of the hydrogen-lean gas is introduced into the at least one activation reactor.

16. A system for activation of hydrocarbon synthesis catalyst, the system comprising:
at least one hydrogen extraction unit comprising an inlet for a synthesis feedgas from a synthesis feedgas line and adapted to remove at least one hydrogen-rich gas, via at least one hydrogen-rich gas outlet, and at least one hydrogen-lean gas, via at least one hydrogen-lean gas outlet, from the synthesis feedgas to yield a refined synthesis gas;
at least one hydrocarbon synthesis reactor fluidly connected with the at least one hydrogen extraction unit and configured to provide liquid hydrocarbons and a first byproduct gas, extracted therefrom via a hydrocarbon synthesis reactor tailgas outlet line, from a synthesis reactor feedstream comprising at least a portion of the refined synthesis gas;
at least one activation reactor fluidly connected with the at least one hydrogen extraction unit and the at least one hydrocarbon synthesis reactor, and configured for activation of hydrocarbon synthesis catalyst via an activation gas,
wherein the at least one activation reactor is connected with the at least one hydrogen extraction unit via the at least one hydrogen-lean gas outlet, whereby at least a portion of the hydrogen-lean gas is introduced into the at least one activation reactor;
at least one product upgrading unit configured to upgrade at least a portion of the liquid hydrocarbons, providing upgraded hydrocarbons and a second byproduct gas, wherein the product upgrading unit comprises a product upgrading unit tailgas outlet line configured for extraction of the second byproduct gas therefrom,
wherein the at least one product upgrading unit is fluidly connected with the at least one dedicated activation reactor, via the product upgrading unit tailgas outlet line, such that at least a portion of the second byproduct gas can be introduced into the at least one dedicated activation reactor as activation gas.

17. The system of claim 16 wherein the at least one product upgrading unit is fluidly connected with the at least one hydrogen extraction unit via the at least one hydrogen-rich gas outlet, whereby at least a portion of the at least one hydrogen-rich gas is introduced into the product upgrading unit.

18. The system of claim 16 wherein (a) the at least one product upgrading unit is fluidly connected with the at least one hydrocarbon synthesis reactor, via the product upgrading unit tailgas outlet line, such that at least a portion of the second byproduct gas can be introduced into the at least one hydrocarbon synthesis reactor as a component of the synthesis reactor feedstream; wherein (b) the system further comprises a recycle line fluidly connecting the product upgrading unit tailgas outlet line with an inlet of the at least one product upgrading unit, whereby at least a portion of the second byproduct gas provided by the at least one product upgrading unit can be reintroduced into the at least one product upgrading unit; or both (a) and (b).

19. The system of claim 15 wherein (a) the at least one hydrogen extraction unit is fluidly connected with the at least one hydrocarbon synthesis reactor via the at least one hydrogen-rich gas outlet line, such that at least a portion of the hydrogen-rich gas can be utilized as a component of the synthesis reactor feedstream; wherein (b) the system further comprises a recycle line fluidly connecting the hydrocarbon synthesis reactor tailgas outlet line with an inlet of the at least one hydrocarbon synthesis reactor, whereby at least a portion of the first byproduct gas can be recycled to the at least one hydrocarbon synthesis reactor; or both (a) and (b).

20. The system of claim 15 wherein the at least one hydrogen extraction unit is fluidly connected with the at least one activation reactor via the at least one hydrogen-rich gas outlet, whereby at least a portion of the at least one hydrogen-rich gas may be introduced into the at least one activation reactor.

21. The system of claim 1 further comprising a gasifier configured to produce the synthesis feedgas via gasification of a carbonaceous material, wherein the gasifier is fluidly connected with the inlet for synthesis feedgas via the synthesis feedgas line.

* * * * *